US008287143B2

(12) United States Patent
Ford

(10) Patent No.: US 8,287,143 B2
(45) Date of Patent: Oct. 16, 2012

(54) SUPPLEMENTARY POWER SUPPLY FOR PORTABLE ELECTRICAL DEVICES

(75) Inventor: Timothy D. F. Ford, Beaconsfield (CA)

(73) Assignee: The Flewelling Ford Family Trust, Beaconsfield (CA)

( * ) Notice: Subject to any disclaimer, the term of this patent is extended or adjusted under 35 U.S.C. 154(b) by 262 days.

(21) Appl. No.: 12/404,596

(22) Filed: Mar. 16, 2009

(65) Prior Publication Data

US 2009/0231839 A1 Sep. 17, 2009

Related U.S. Application Data

(60) Provisional application No. 61/036,663, filed on Mar. 14, 2008.

(51) Int. Cl.
*F21L 13/06* (2006.01)
*F02B 63/04* (2006.01)
*H02K 7/116* (2006.01)

(52) U.S. Cl. ......... 362/192; 362/183; 362/208; 290/1 C; 320/114

(58) Field of Classification Search ................... 362/183, 362/192, 193, 119; 320/114, 101, 106; 290/1 R, 290/1 A, 1 C, 1 E
See application file for complete search history.

(56) References Cited

U.S. PATENT DOCUMENTS

| 3,573,479 | A | | 4/1971 | Rieth | |
|---|---|---|---|---|---|
| 4,332,006 | A | * | 5/1982 | Choe | 362/193 |
| 4,701,835 | A | * | 10/1987 | Campagnuolo et al. | 362/192 |
| 5,552,973 | A | | 9/1996 | Hsu | |
| 5,839,817 | A | * | 11/1998 | Wei | 362/192 |
| 5,880,532 | A | * | 3/1999 | Stopher | 290/1 E |
| 5,949,215 | A | | 9/1999 | Takakura | |
| 6,322,233 | B1 | | 11/2001 | Brandt | |
| 6,388,390 | B2 | * | 5/2002 | Rachwal | 315/200 R |
| 6,563,269 | B2 | * | 5/2003 | Robinett et al. | 315/86 |
| 6,588,918 | B1 | * | 7/2003 | Millar | 362/192 |
| 6,664,759 | B1 | | 12/2003 | Goris | |
| 7,049,708 | B2 | | 5/2006 | Hartman et al. | |
| 7,090,372 | B2 | * | 8/2006 | Liao et al. | 362/192 |
| 7,183,745 | B2 | * | 2/2007 | Kubale et al. | 320/114 |
| 7,465,061 | B2 | * | 12/2008 | Ho et al. | 362/192 |
| 2004/0062039 | A1 | | 4/2004 | Ahn | |
| 2006/0098427 | A1 | * | 5/2006 | Yeh | 362/192 |
| 2006/0245182 | A1 | * | 11/2006 | Lee | 362/192 |
| 2007/0090787 | A1 | | 4/2007 | Yu et al. | |
| 2007/0147029 | A1 | * | 6/2007 | Yen | 362/192 |
| 2009/0147505 | A1 | * | 6/2009 | Robinett | 362/183 |

FOREIGN PATENT DOCUMENTS

JP 10210673 A 7/1998

* cited by examiner

*Primary Examiner* — Peggy A. Neils
(74) *Attorney, Agent, or Firm* — Goudreau Gage Dubuc; Hugh Mansfield

(57) ABSTRACT

A supplementary power supply and method for powering a portable electrical device such as a flashlight having a positive terminal and a negative terminal and battery compartment adapted to receive a standard battery therein. The supply comprises a cap adapted for installation on the battery compartment, an electrical circuit comprising a generator and a positive output and a negative output, and an actuator in mechanical communication with the generator and capable of actuation when the power supply is within the compartment and the cap is installed on the compartment, wherein the electrical circuit is sized and shaped to be received within the battery compartment and interconnect the positive output with the positive terminal and the negative output with the negative terminal, and actuation of the actuator operates the generator to provide an electrical current between the positive output and the negative output. There is also disclosed a kit comprising a plurality of replacement caps.

5 Claims, 5 Drawing Sheets

SUPPLEMENTARY POWER SUPPLY FOR PORTABLE ELECTRICAL DEVICES

CROSS REFERENCE TO RELATED APPLICATIONS

This application claims priority from U.S. provisional application Ser. No. 61/036,663, filed on Mar. 14, 2008, which is incorporated herein in its entirety by reference.

FIELD OF THE INVENTION

The present invention relates to a supplementary power supply for powering portable electrical devices. In particular, the battery cap is adapted to be positioned on the battery compartment of a conventional lighting device for powering the device without battery power or in compensation for a drained battery.

BACKGROUND OF THE INVENTION

Commonly known portable lighting devices, such as flashlights, typically use one or more batteries to provide the voltage necessary to the working of the lighting elements housed therein. However, the lifetime of the batteries is shortened by continuous use, resulting in the device becoming unworkable unless the batteries are changed or recharged. Still, used batteries are known to cause environmental pollutions when not properly disposed of and rechargeable batteries can typically only be recharged a limited number of times, in addition to requiring an external power source for recharging. It is therefore desirable to provide a system for self-powering the lighting device once one or more batteries run short, thus ensuring that the device remains workable despite some of the batteries being drained.

The prior art teaches a plurality of manually operated electrical power sources, which can be used with portable lighting devices for recharging the battery power source of the device or powering the latter when the batteries are drained. For example, a generator may be mounted within the battery compartment of the device and operated by traction, rotary motion, or the like to generate electrical energy for powering the device. A drawback of these systems however is that they use complicated power assemblies and are typically permanently installed within the battery compartment, thus not providing a convenient way to remove the generator if desired.

What is therefore needed, and an object of the present invention, is a generator, which can be easily and removably positioned within the battery compartment of a conventional lighting device for powering the device without battery power or in compensation for a drained battery.

SUMMARY OF THE INVENTION

More specifically, in accordance with the present invention, there is provided a supplementary power supply for powering a portable electrical device having a positive terminal and a negative terminal and battery compartment adapted to receive a standard battery therein. The supply comprises a cap adapted for installation on the battery compartment, an electrical circuit comprising a generator and a positive output and a negative output, and an actuator in mechanical communication with the generator and capable of actuation when the power supply is within the compartment and the cap is installed on the compartment, wherein the electrical circuit is sized and shaped to be received within the battery compartment and interconnect the positive output with the positive terminal and the negative output with the negative terminal, and actuation of the actuator operates the generator to provide an electrical current between the positive output and the negative output.

There is also provided a portable light comprising a first electrical circuit comprising at least one LED and an on/off switch, a positive terminal and a negative terminal, a battery compartment adapted for receiving a conventional battery, a cap adapted for installation on the battery compartment, a second electrical circuit comprising a dynamo and a positive output and a negative output, and an actuator in mechanical communication with the dynamo and capable of actuation when the power supply is within the compartment and the cap is installed on the compartment, wherein the electrical circuit is sized and shaped to be received within the battery compartment and interconnect the positive output with the positive terminal and the negative output with the negative terminal, and actuation of the actuator operates the dynamo to provide an electrical current between the positive output and the negative output.

Additionally, there is provided a method of powering a portable electrical device having a positive terminal and a negative terminal and battery compartment having a cap and adapted to receive a standard battery therein. The method comprises removing the cap from the battery compartment, providing a power supply comprising a replacement cap, an electrical circuit comprising a generator and a positive output and a negative output, the electrical circuit sized and shaped to be received within the battery compartment and on insertion to the battery compartment, interconnect the positive output with the positive terminal and the negative output with the negative terminal, and an actuator in mechanical communication with the generator and capable of actuation when the power supply is within the battery compartment and the replacement cap is installed on the battery compartment, securing the power supply in the battery compartment using the replacement cap, and actuating the actuator to provide an electrical current between the positive output and the negative output.

A supplementary power supply kit for powering a plurality of portable electrical devices, each of the devices having a positive terminal and a negative terminal, a battery compartment cap and battery compartment adapted to receive a standard battery therein. The kit comprises a plurality of replacement caps, each of the replacement caps adapted to replace a respective one of the battery compartment caps, an electrical circuit comprising a generator and a positive output and a negative output, and an actuator in mechanical communication with the generator and capable of actuation when the power supply is within the compartment and the replacement cap is installed on the compartment, wherein the electrical circuit is sized and shaped to be received within the battery compartment and interconnect the positive output with the positive terminal and the negative output with the negative terminal, and actuation of the actuator operates the generator to provide an electrical current between the positive output and the negative output.

Other objects, advantages and features of the present invention will become more apparent upon reading of the following non-restrictive description of specific embodiments thereof, given by way of example only with reference to the accompanying drawings.

DETAILED DESCRIPTION OF THE ILLUSTRATIVE EMBODIMENTS

Figure 1:
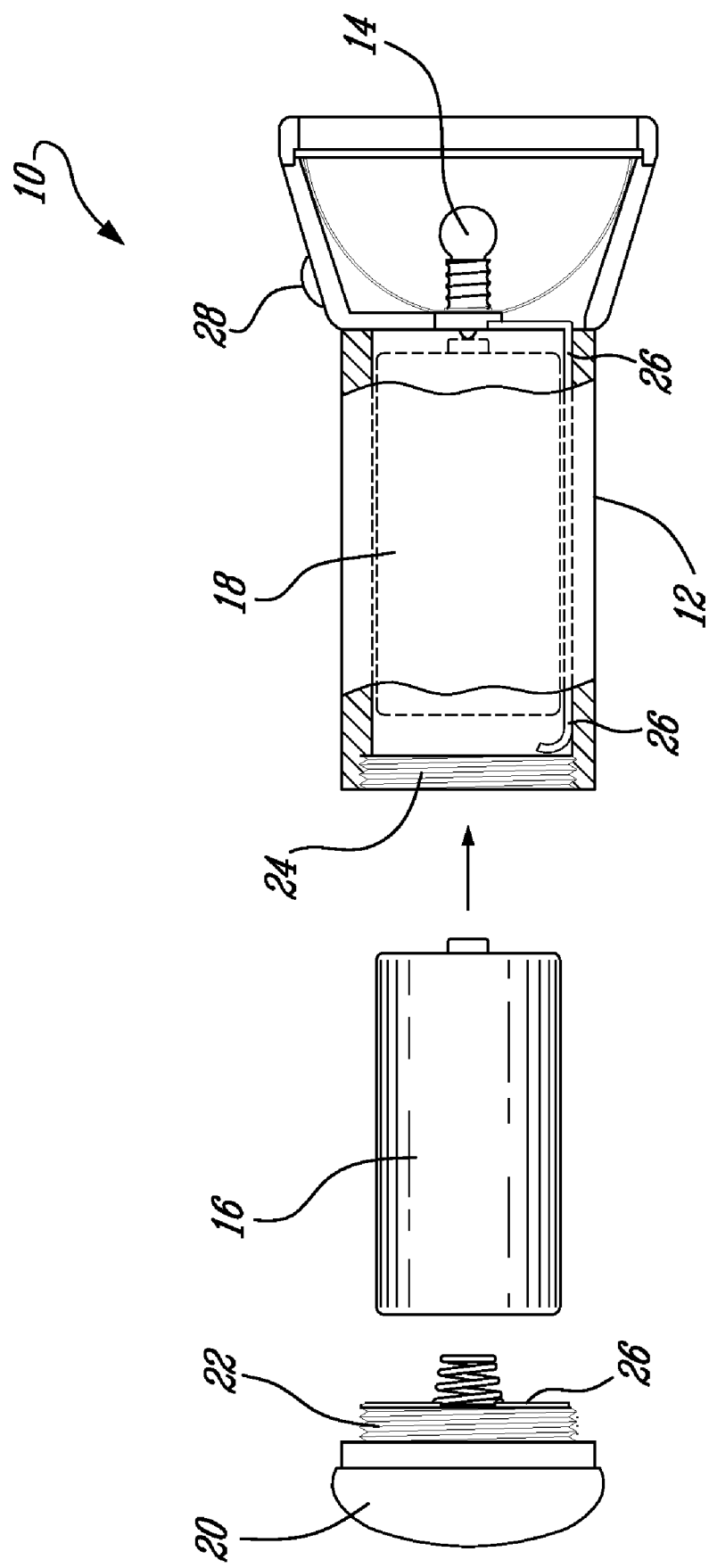
FIG. 1 is a schematic diagram of a prior art portable lighting device.

Referring now to FIG. 1, an illustrative embodiment of a prior art portable lighting device, such as a conventional flashlight or the like, generally referred to using the reference numeral 10, will now be described. The lighting device 10 comprises a hollow body 12 housing at a front end thereof at least one lighting element 14, such as a Light Emitting Diode (LED), an incandescent light, or the like. The lighting element 14 produces radiation, which may be white light or light in a variety of colours as well as radiation in the infrared range, and is typically powered by at least one battery as in 16 retained within the body 12 in a battery compartment 18. Illustratively, the battery 16 is a standard battery (e.g. 1.5V AA battery) and as will be apparent to a person skilled in the art, more than one battery 16 may be used to illuminate the device 10, although one is illustrated for sake of clarity and simplicity.

Still referring to FIG. 1, the batteries as in 16 are retained within the battery compartment 18 by a cap 20 mounted at a rear end of the body 12. The cap 20 illustratively comprises a threaded portion 22, which is adapted to mate with a threaded end 24 of the battery compartment 18, thereby preventing the egress of moisture and dirt into the compartment 18. Illustratively, the device 10 further comprises power supply circuitry comprising at least one electrical terminal 26 mounted within the body 12 adjacent the lighting element 14. The power supply circuitry is configured for delivery of electric current from the battery 16 to the lighting element 14 for illumination thereof. A switch 28 (conventionally known in the art) may also be mounted on the body 12 to allow a user to activate or deactivate power transmission to the lighting element 14, thus illuminating the latter as desired.

Figure 2:
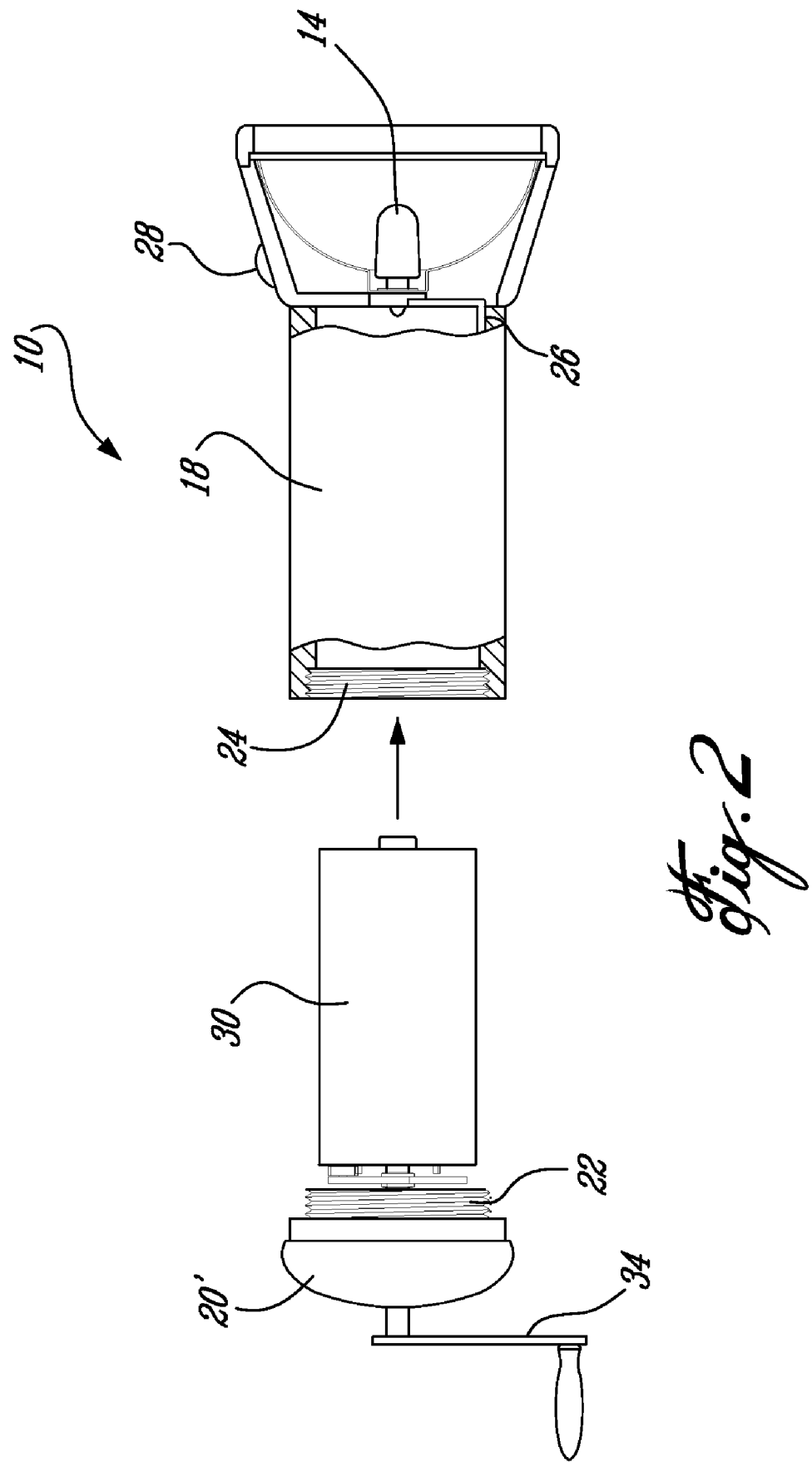
FIG. 2 is a schematic diagram of a portable lighting device with supplementary power supply in accordance with an illustrative embodiment of the present invention.

Referring now to FIG. 2, an adaptor cap 20' comprising a generator, or dynamo, 30 extending therefrom is illustratively provided to replace the conventional battery compartment cap (reference 20 in FIG. 1) for providing additional functionality (i.e. the removable generator 30) to the lighting device 10. For this purpose, the protrusion formed by the generator 30 mounted on the cap 20' is of a size and shape to replicate the shape and size of the battery 16 so as to be substitutable therefor. As such, the generator 30 fits within the battery compartment 18 and when the cap 20' and generator 30 assembly is attached to the battery compartment 18, the cap 20' seals the battery compartment 18 in the same manner as the conventional cap 20 described herein above. As will be apparent to a person skilled in the art, the electrical terminal 26 of the lighting device 10 is connected to the generator 30 by the simple insertion of the latter into the battery compartment 18, thus delivering power generated by the generator 30 to the lighting element 14. The generator 30 within the cap 20' therefore allows for the lighting element 14 to be operated without battery power, if desired. Thus, the present invention advantageously ensures that the device 10 remains workable despite the batteries as in 16 being drained. In addition, the generator 30 being attached to the cap 20' allows the generator 30 to be easily placed into and removed from the battery compartment 18 as desired, thus adding to the functionality of the device 10, which can be operated either by the use of battery power or of the generator 30. As will be apparent to a person skilled in the art, the generator 30 may be any device capable of generating energy, provided it is sufficiently small to be mounted on the cap 20' and fit within the battery compartment 18 yet capable of generating relatively high power for illuminating the lighting device 14.

Figure 3:
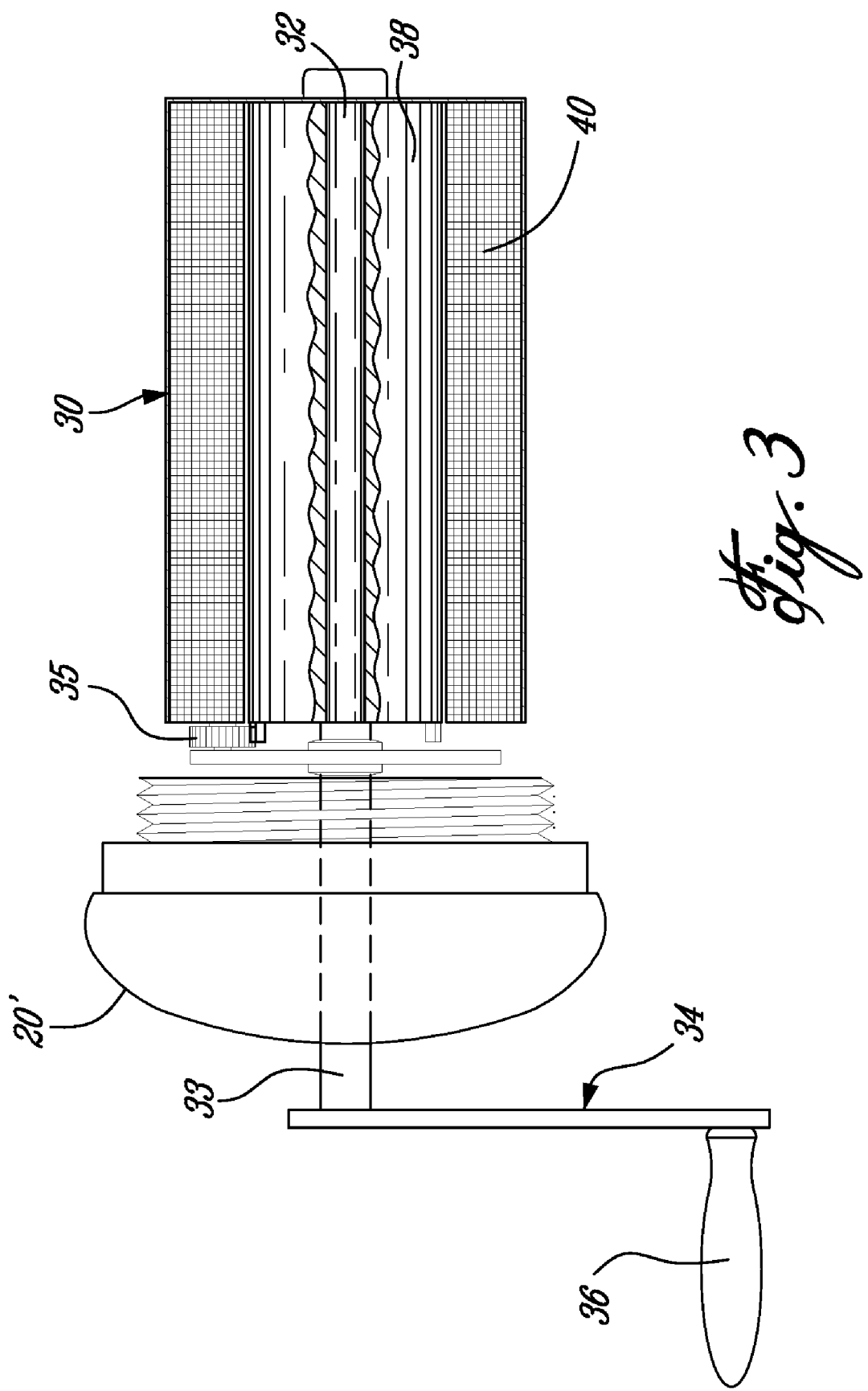
FIG. 3 is a schematic diagram of a generator in accordance with an illustrative embodiment of the present invention.

Referring now to FIG. 3, the generator 30 illustratively comprises a drive shaft 32, which when rotated allows the generator 30 to produce power. The shaft 32 is illustratively coupled to the shaft 33 of a hand-operated cranking device 34 secured to one end of the cap 20' by way of a gear mechanism comprising at least one gear 35, with the shaft 33 extending through the cap 20' in an axis parallel to the axis of the shaft 32. The gear 35 provides the necessary ration between the cranking device 34 and the shaft 32 of the generator 30. As will be apparent to a person skilled in the art, the gear mechanism may be comprised of a train of gears as in 35 mounted in a plurality of stages on suitable bearings (not shown), provided the gears as in 35 are sufficiently small to be as close as possible to the cap 20', thus providing for a compact design.

Still referring to FIG. 3, the cranking device 34 illustratively comprises a handgrip 36 adapted to be easily grasped by the user for manual rotation. As will be further apparent to a person skilled in the art, rotation of the handgrip 36 results in rotational force being transmitted by the cranking device 34 to the drive shaft 32. Illustratively, the cranking device 34 is designed such that one rotation of the handgrip 36 results in 28 rotations of the drive shaft 32. The generator 30 then converts the mechanical energy induced by rotation of the drive shaft 32 into electrical energy in a conventional manner, e.g. using electromagnetic induction. For this purpose and as known in the art, the generator 30 illustratively comprises a mechanical part and an electrical part. The mechanical part typically comprises a rotational component or rotor 38 illustratively mounted on the drive shaft 32 and driven by an external torque (e.g. cranking motion) and a stationary component or stator 40 mounted around the rotor 38. The electrical part typically comprises components (not shown), such as electromagnets or permanent magnets mounted on either the rotor 38 or stator 40, that generate a rotating magnetic field and components (not shown), such as armature circuits positioned on either the rotor 38 or stator 40, that produce an electromotive force or voltage as a result of the varying magnetic field. The electrical energy thus generated by the generator 30 illuminates the lighting element 14 of the device 10.

Figure 4:
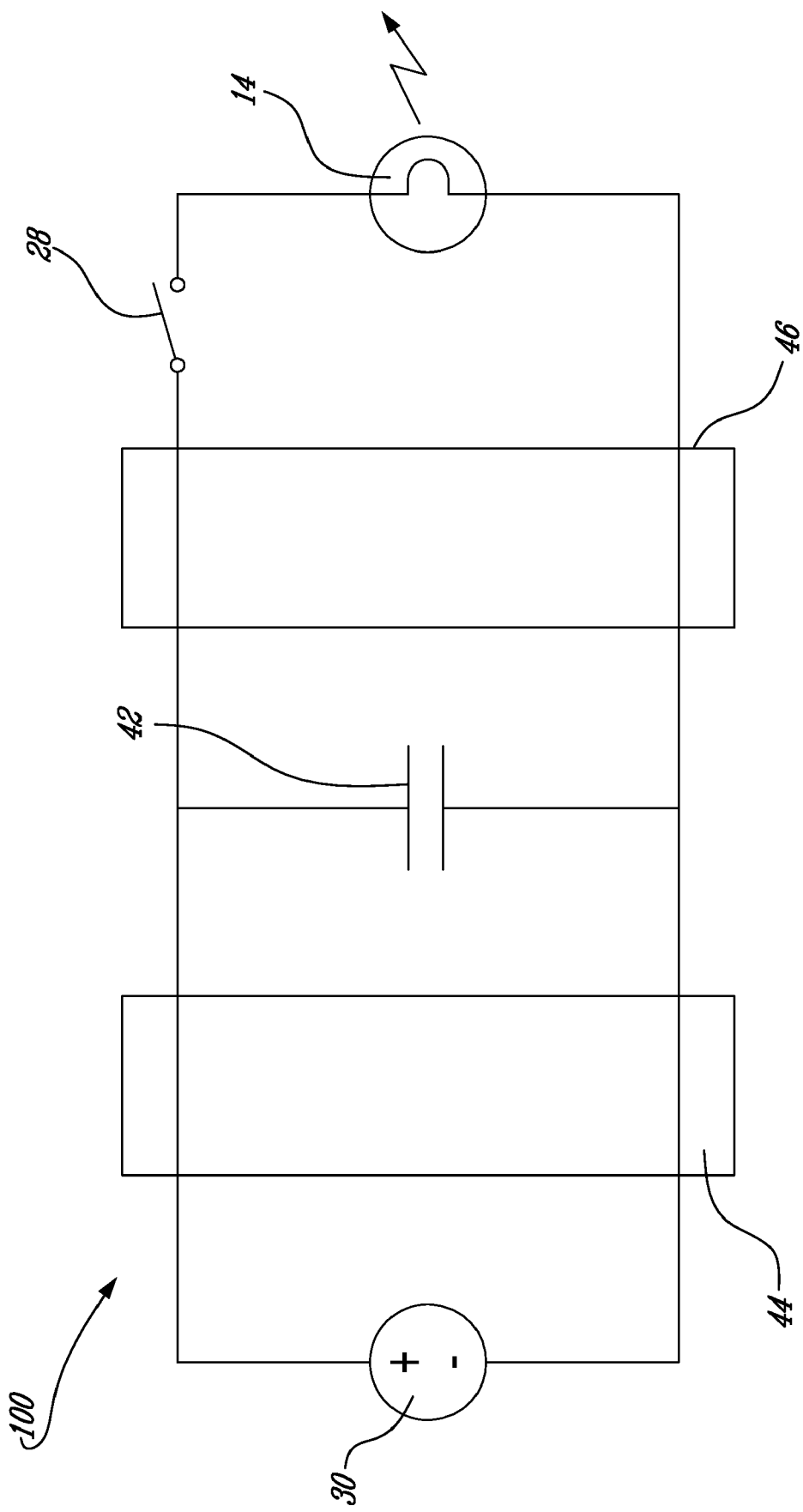
FIG. 4 is a schematic diagram of the electrical circuit of a portable lighting device with generator in accordance with an illustrative embodiment of the present invention.

Referring now to FIG. 4, an exemplary circuit diagram 100 for use in accordance with one embodiment of the present invention will now be described. The generator 30 is illustratively connected to a capacitor 42 for storing energy produced by the generator 30, thus allowing for power to be delivered to the lighting element 14 after the cranking device 34 has been deactivated. As will be apparent to a person skilled in the art, the capacitor 72, which may be mounted on a Printed Circuit Board (PCB) (not shown), may be any of a variety of devices useful for storing electrical energy (e.g. thin-film capacitor having high, super or ultra capacity, or other device).

Still referring to FIG. 4, in one embodiment of the present invention and as will be apparent to a person skilled in the art, circuitry 44 may also be provided between the generator 30 and the capacitor 42 to perform a variety of functions. For example, the circuit 44 may comprise a diode (not shown) to prevent current drain to the capacitor 42 or a transformer, fullor half-wave rectifier, or other circuitry (not shown) to provide for AC/DC conversion when the generator 30 generates an alternating current (preferably a three-phase generator). In the latter case, the capacitor 42 may be configured to store DC voltage. It will also will be apparent to a person skilled in the art, that additional circuitry 46 (e.g. circuitry for voltage regulation, increasing and/or decreasing voltage, and/or DC/DC conversion) may be provided between the capacitor 42 and the lighting element 14 to ensure that the capacitor 42 delivers a relatively constant and consistent power level thereto, even if the power input (from the capacitor 42) varies. Circuitry (not shown) for providing over-voltage protection to avoid damage of the capacitor 42 and other components may also be provided.

Figure 5:
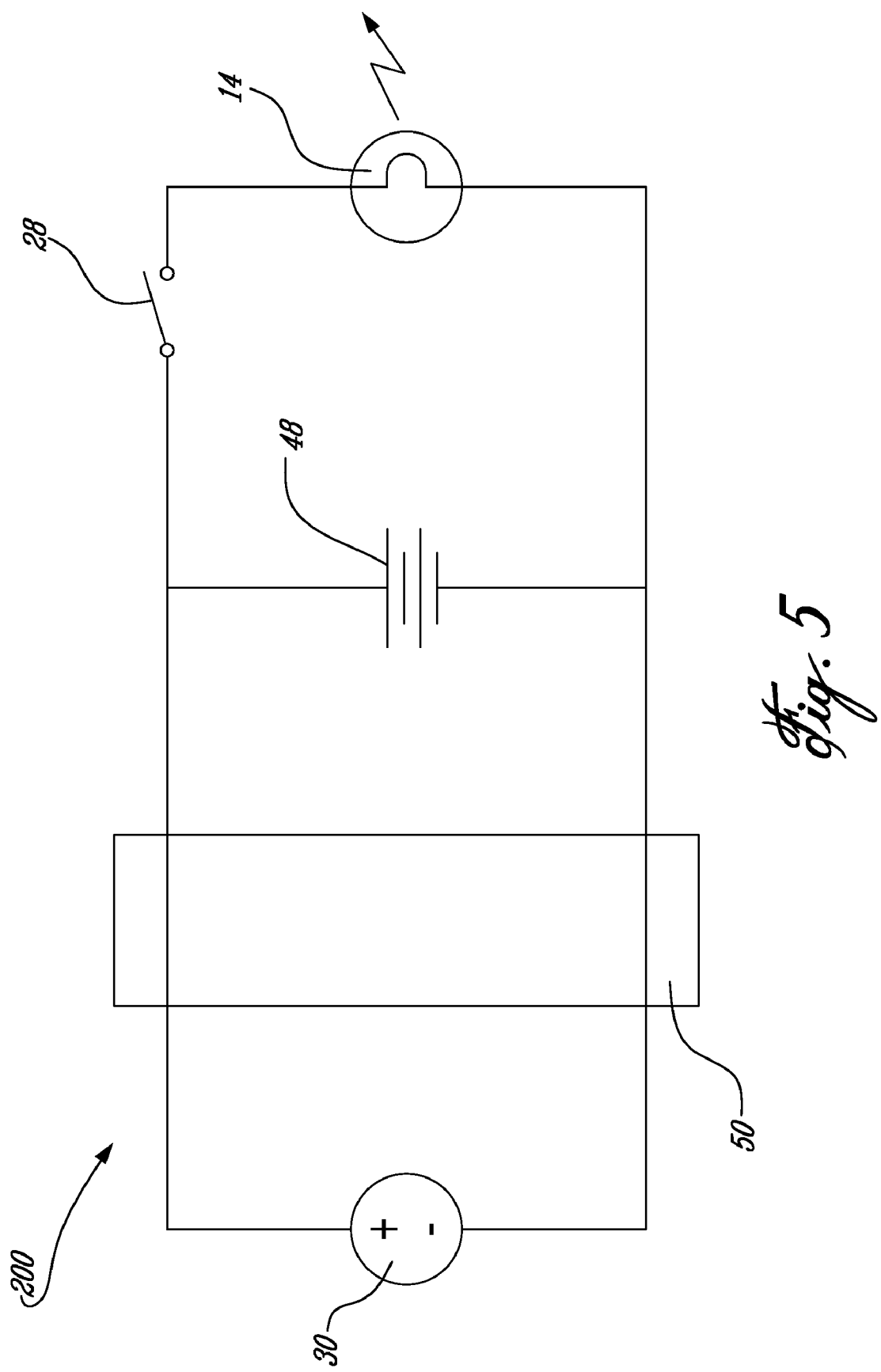
FIG. 5 is a schematic diagram of a portable lighting device with supplementary power supply in accordance with an alternative illustrative embodiment of the present invention.

Referring now to FIG. 5 and according to an alternative illustrative embodiment of the present invention, the generator 30 may be coupled to a rechargeable battery 48, thus acting as a battery charging unit, as shown by the exemplary circuit diagram 200. Illustratively, circuitry 50 is provided between the generator 30 and the battery 48 and may comprise a device, such as a capacitor (not shown), for storing energy produced by the generator 30 as well as further electronics for ensuring that a relatively constant and consistent power level (illustratively 4.5 Volts DC) is delivered to the lighting element 14. As will be apparent to a person skilled in the art, as most of the energy produced by the generator 30 will be stored in the battery 48, coupling the rechargeable battery 48 to the generator 30 alleviates the need for a capacitor having high capacity. Preferably, a high-capacity rechargeable battery, such as a Nickel-Metal Hydride battery, is used. Illustratively, upon actuation of the cranking device 34, the generator 30 produces power, which is then stored in the battery 48, thus charging the latter. The power stored in the battery 48 is then delivered to the lighting element 14 for illumination thereof.

Referring back to FIG. 2 and according to another illustrative embodiment of the present invention, the cap 20' and generator 30 assembly may be adapted to the type of device 10 being powered. Illustratively, a generator 30 providing the desired power to the lighting element 14 may be adapted to be mounted to one of a plurality of caps as in 20', each cap being designed for attachment to a corresponding one of a plurality of portable lighting devices as in 10 having differently designed battery compartments 18. For example, a plurality of caps as in 20' may be designed having different configurations for the threaded portion 22, which are adapted to mate with different threaded ends as in 24 of a plurality of battery compartments as in 18. In this manner, a plurality of adaptor cap configurations may be provided for conveniently mounting to a plurality of conventional lighting devices as in 10.

Although the present invention has been described hereinabove by way of specific embodiments thereof, it can be modified, without departing from the spirit and nature of the subject invention as defined in the appended claims.

What is claimed is:

1. A method of powering a portable electrical device having a positive terminal and a negative terminal and battery compartment having a cap and a standard battery therein, the method comprising:
   removing the cap and the standard battery from the battery compartment;
   providing a power supply comprising a replacement cap, an electrical circuit comprising a generator and a positive output and a negative output, said electrical circuit sized and shaped to be received within the battery compartment in a space liberated by removal of the standard battery there from, and on insertion to the battery compartment, interconnect said positive output with the positive terminal and said negative output with the negative terminal, and an actuator in mechanical communication with said generator and capable of actuation when said power supply is within the battery compartment and said replacement cap is installed on the battery compartment;
   securing said power supply in the battery compartment using said replacement cap; and
   actuating said actuator to provide an electrical current between said positive output and said negative output;
   wherein said electrical circuit replaces the standard battery which would otherwise provide electricity for powering the device during operation.

2. The method of claim 1, further comprising a drive shaft attached to said generator, wherein said generator operates to generate electricity when rotated by said drive shaft, said actuator comprises a handle attached to an end of said drive shaft for rotating said drive shaft and wherein actuating said actuator comprises rotating said drive shaft using said handle.

3. The method of claim 1, wherein said electrical circuit further comprises a capacitor for storing energy generated by operation of said generator, said stored energy being available as an electrical current between said positive output and said negative output.

4. The method of claim 1, wherein said electrical circuit further comprises a rechargeable battery for storing energy generated by operation of said generator, said stored energy being available as an electrical current between said positive output and said negative output.

5. The method of claim 1, wherein said battery compartment is adapted to receive a conventional battery selected from the group consisting of AAA, AA, D, C, LR06, 9-volt and button cell.

* * * * *